United States Patent [19]
Johnson

[11] 4,054,031
[45] Oct. 18, 1977

[54] POWER UNIT

[76] Inventor: Charles M. Johnson, 9451 E. Ave. T-12, Littlerock, Calif. 93543

[21] Appl. No.: 659,590

[22] Filed: Feb. 19, 1976

[51] Int. Cl.² ........................... F03B 9/00; F03G 7/00
[52] U.S. Cl. .......................................... 60/496; 415/7
[58] Field of Search ................. 415/5, 7; 60/495, 496

[56] References Cited

U.S. PATENT DOCUMENTS

| 233,319 | 10/1880 | Boerner | 60/496 |
| 2,135,110 | 11/1938 | Platt | 60/496 |
| 3,360,926 | 1/1968 | Parr | 60/496 |
| 3,887,817 | 6/1975 | Steelman | 415/5 |
| 3,907,454 | 9/1975 | Punton | 60/496 |

FOREIGN PATENT DOCUMENTS

| 508,370 | 10/1920 | France | 415/5 |
| 2,782 of | 8/1873 | United Kingdom | 60/496 |

Primary Examiner—Allen M. Ostrager
Attorney, Agent, or Firm—J. C. Baisch

[57] ABSTRACT

A power unit having an endless belt immersed in a tank of water and disposed on upper and lower rotatable rollers in parallel alignment tightly enough to frictionally engage and rotate the pullies, there being transversely arranged and longitudinally spaced, relative to the belt, collapsible air buckets or air traps on the outwardly facing side of the belt. When operating, the belt has one part continually moving upwardly and an opposite part moving downwardly. The air buckets open downwardly and expand on the upwardly moving part of the belt; and those on the opposite downwardly moving part open upwardly in a collapsed condition. Air is pumped to a horizontally disposed discharge pipe adjacent the lower end of the belt, the pipe having openings for discharge of air into the succeeding lower open buckets to cause the buckets to be filled with air and expand the buckets so as to move buoyantly upwardly. The free edges of the buckets are provided with air chambers to aid in initial opening of the buckets to facilitate entrance of the air from the discharge pipe into the buckets. When the buckets reach the top of the apparatus, they collapse and expel the air and, as they move downwardly on the opposite downwardly moving side of the belt, they are held collapsed by the water so as to offer little resistance. The upper pulley has a driving connection with an air pump, the outlet of which is connected to the air discharge pipe at the lower end of the apparatus. The air buckets have panels fixed to the belt and movable panels hinged thereto. The fixed panels are flexible so that they will conform to the curvature of the rollers as the buckets pass over the rollers. The air-filled buckets or air traps have great buoyancy and produce sufficient force to operate the air pump, and also to operate auxiliary equipment such as, for example, an electric generator or the like for supplying power for various uses. While an outside supply of air under pressure is provided to start the apparatus operating (after which it will be self-operating) the apparatus will start operating when the apparatus is mounted in the tank and the tank is filled with water.

15 Claims, 8 Drawing Figures

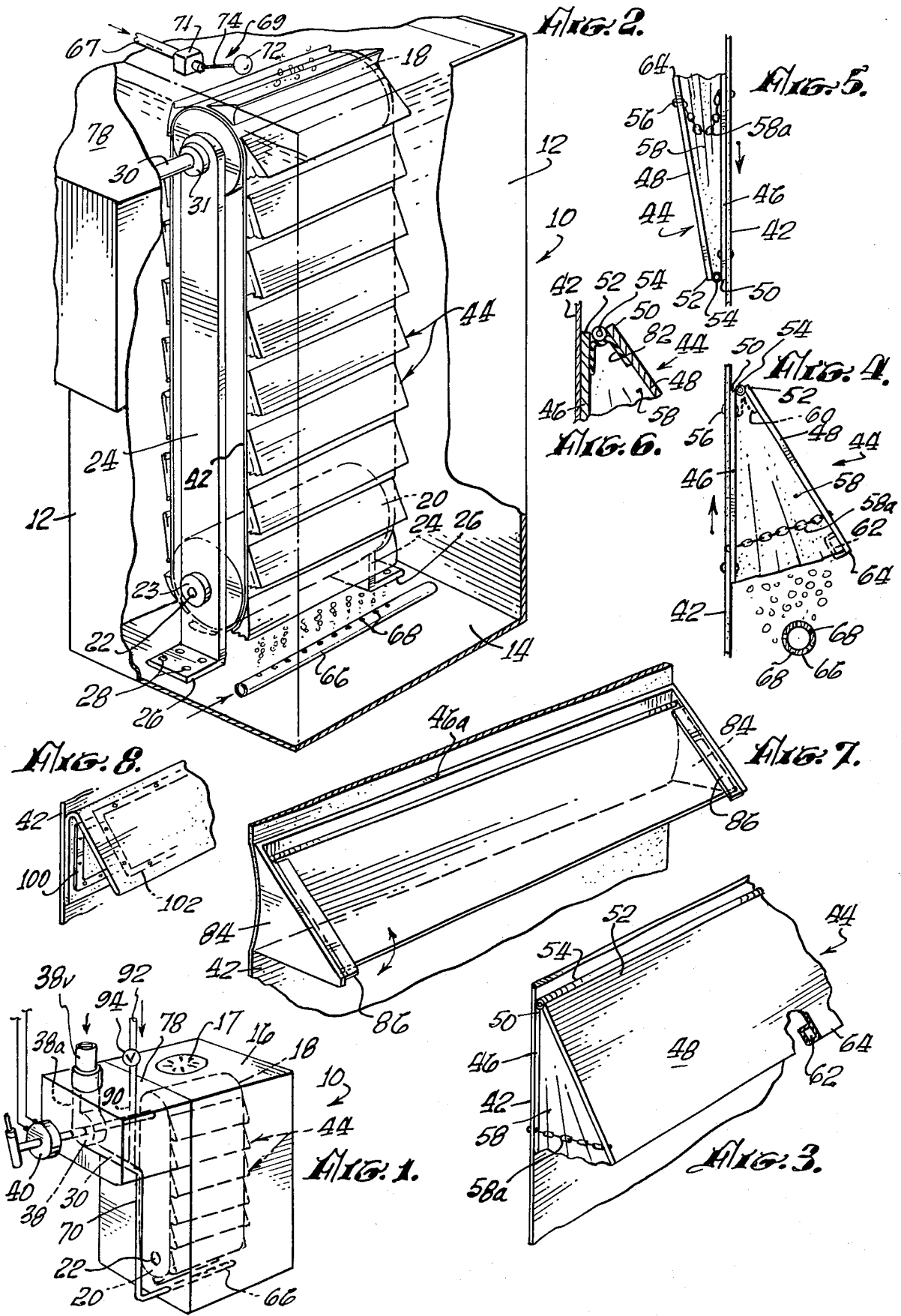

POWER UNIT

BACKGROUND OF THE INVENTION

1. Field of the Invention

This invention relates generally to apparatus for producing power and relates more generally to apparatus utilizing the buoyancy of air confined in air traps.

2. Description of the Prior Art

There have been various devices that have been proposed for producing power inexpensively, but these have not proven to be satisfactory.

SUMMARY OF THE INVENTION

The invention comprises a pair of rotatable rollers spaced vertically apart and carried by support members. An endless belt is disposed on the rollers so that one part of the belt moves upwardly and the opposite part moves downwardly when the apparatus is in operation. The apparatus is disposed in a body of water and there are a plurality of collapsible buckets or air traps secured to the belt and extending transversely of the belt and spaced longitudinally thereof. Each air trap comprises a pair of panels hinged together along adjacent transverse edges by means of a hinge; and at the ends the panels are closed by flexible walls of imperforate material such as a suitable plastic. The flexible end walls are accordian creased and are adapted to move between folded or accordian positions and expanded accordion positions. The buckets thus provide air buckets or traps and the interior of the buckets have a flexible seal along the hinged edges to prevent loss of air through the hinges. One of the panels, termed herein a fixed panel, is flexible and is secured to the belt by means of rivets or other suitable means; and the free edge of the other panel is provided with an air chamber which extends the length of the bucket. Immersed in the water and located adjacent the lower end of the belt, and substantially beneath and in alignment with the part of the belt adapted to move upwardly, is an air-discharge pipe having a plurality of longitudinally spaced air-discharge openings which will discharge into the lower open ends of succeeding buckets or air traps. With the buckets arranged so that their open ends will face downwardly when moving upwardly with the upwardly moving part of the belt, the buckets provide great power due to their buoyancy when filled with air and, when they reach the top or upper roller, air escapes from the buckets as they pass over the top roller; and, as they are carried downwardly by the downwardly moving part of the belt, the open ends of the buckets face upwardly and the buckets are empty of air, until they reach the lower roller and pass around it into position for receiving air from the discharge pipe. The upper roller has a driving connection with the air pump which supplies air under pressure to the discharge pipe; and an auxiliary piece of apparatus is connected to the upper roller so as to be operated thereby. Such apparatus may be an electric generator or other suitable device. Air under pressure from an auxiliary source is used to start the apparatus.

OBJECTS AND ADVANTAGES OF THE INVENTION

It is an object of the invention to provide a self-energizing power unit.

It is another object of the invention to provide a power unit of this character that is self-energizing and adapted to produce power over and above that produced for operation of the apparatus.

It is still another object of the invention to provide apparatus of this character that is simple in construction and operation.

It is a further object of the invention to provide apparatus of this character that is relatively inexpensive to manufacture and maintain.

A still further object of the invention is to provide a plurality of air buckets or traps attached to an endless belt entrained on rollers, the air buckets being collapsible, and expandable as filled by air.

Another object of the invention is to provide apparatus of this character wherein the belt and buckets pass smoothly over the rollers.

The characteristics and advantages of the invention are further sufficiently referred to in connection with the following detailed description of the accompanying drawings, which represent one embodiment.

After considering this example, skilled persons will understand that many variations may be made without departing from the principles disclosed and I contemplate the employment of any structure, arrangements or modes of operation that are properly within the scope of the appended claims.

BRIEF DESCRIPTION OF THE DRAWINGS

Referring to the drawings which are for illustrative purposes only:

FIG. 1 is a schematic perspective view of apparatus embodying the present invention;

FIG. 2 is an enlarged schematic perspective view of the apparatus with portions broken away to show the interior construction thereof;

FIG. 3 is an enlarged perspective view of a portion of one of the air traps or buckets partially expanded;

FIG. 4 is an end view of a bucket in its expanded condition showing air being delivered into the bucket;

FIG. 5 is an end view of one of the buckets in its collapsed and inverted condition;

FIG. 6 is a perspective partial cross-sectional view of a portion of an air bucket showing the seal for the hinge;

FIG. 7 is a perspective view of an alternate bucket; and

FIG. 8 is a fragmentary perspective of an alternative bucket arrangement.

DESCRIPTION OF THE PREFERRED EMBODIMENT

Referring more particularly to FIG. 1, there is shown apparatus embodying the present invention. The power unit is immersed in water. It may be in open water such as a lake or it may be immersed in a tank or container, such as indicated at 10. The container has side walls 12 and a bottom wall 14 and, if desired, a top wall or cover 16 having an air-escape vent 17. There is an upper roller 18 and a lower roller 20. The lower roller has an axial shaft 22 which extends outwardly of the ends of the roller and said ends are journaled at 23 in support members 24, the lower ends 26 of which are turned outwardly at right angles; and these ends are secured to the bottom wall 14 by any suitable means, such as screws 28 or the like. The upper roller 18 has a shaft 30 which extends outwardly of its ends and is journaled at 31 in the adjacent suppord members 24. Shaft 30 extends through the adjacent side wall 12 of the container 10 and is connected to an air pump 38 having an air inlet 38a controlled by a valve 38v which controls the air inlet; and, by adjusting this valve, the speed of the apparatus is controlled. The air pump 38 may be of any suitable well-known type or it may be a blower of any well-known type for delivering air under pressure. Also connected to shaft 30 is an electric generator 40 for supplying electrical energy for various purposes. The shaft may be connected to other devices or apparatus, should it be so desired. An endless belt 42 is carried by the rollers 18 and 20, and is tight enough to frictionally effect rotation of said roller. Alternatively, endless chains may be used and the term "belt" as used herein includes chains. There are a plurality of collapsible air buckets, indicated generally at 44, which are secured to an endless belt transversely thereof, said collapsible buckets being spaced apart from each other longitudinally of the belt.

Referring to FIGS. 3 and 4, the buckets are shown as comprising a flexible panel 46 and a stiff solid panel 48 which have adjacent edges 50 and 52 connected together by a hinge 54. The panel 46 is secured to the belt by means of rivets 56 so that panel 46 may be considered a fixed panel, and is so referred to herein, while the panel 48 is pivotally movable toward and away from the panel 46. The ends 58 of the buckets are of flexible material such as a flexible plastic or the like. These ends are imperforate and, because of their flexibility, permit the panel 48 to pivotally move toward and away from the panel 46. There is also a strip 60 of flexible plastic or the like which is attached to the inner sides of the panels and along the hinge 54, such strip being secured by an adhesive or any other suitable means to provide a seal against the escape of air through the hinge. A small air chamber 62 extends along the free edge 64 of the buckets. This air chamber is permanently sealed and provides means for causing the buckets to initially open as soon as it passes around the lower roller. Means for limiting opening of the buckets is provided. As shown, this means comprises a chain 65 at each end of the buckets. One end of the chain is connected to the free edge of the movable panel, the other end being attached to the adjacent edge portion of the panel 46. Other means of any suitable character may be used. Endless belt 42, when disposed on the rollers, will have a portion continuously moving upwardly and a portion at the opposite side that will be continuously moving downwardly.

The hinges of the buckets on the upwardly moving part of the belt are at the top of the buckets so that said buckets open downwardly. The hinges of the buckets on the downwardly moving part of the belt are at the bottom so that the buckets open upwardly and air is exhausted from the buckets as they pass over the upper roller. An air-discharge pipe 66 extends horizontally adjacent the lower roller and substantially in alignment with the plane of the upwardly moving part of the belt. This discharge pipe has a plurality of discharge orifices 68 which are spaced apart longitudinally of the discharge pipe, there being several lines of such discharge openings, with the lines spaced apart from each other circumferentially of the pipe. An air-delivery pipe 70 has one end connected to the blower 38 and the other end connected to the airdischarge pipe, so that when the blower is operated air will be forced into the discharge pipe and discharge therefrom. The discharged air will rise and, as the buckets on the upwardly moving part of the belt pass around the lower roller, the buckets will start to open, aided by the buoyancy of the air in the chamber 62; and the air from the discharged pipe will fill the bucket which will expand to its fully opened position, as shown in FIG. 4, for example. Air that might escape past the lower bucket will be trapped in the next bucket above it. The container 10 is filled with water to a level just below the top of roller 18. When the device is operating, air from the blower is delivered to the discharged pipe 66 and forced out of the orifices 68 to rise in the water and fill the adjacent lower bucket and, as each bucket passes around the lower roller, it will also be filled with air.

The buoyancy of the air in the buckets will force the buckets upwardly and cause the belt to rotate the rollers. As the buckets pass around the top roller, they collapse and discharge the air therefrom so that, as they are carried downwardly, they are maintained in the collapsed position by the pressure of the water against the movable panel. Since the ends of the buckets are flexible and preferably arranged to fold as an accordian, the downwardly moving buckets will be maintained in the collapsed position until they pass around the lower part of the lower roller and begin to open, the air pumped from the air-discharge pipe quickly filling them with air, and the ends 58 of the buckets unfolding to permit full extension of the movable panel 48, said ends limiting the amount of opening or movement of the panel 48. Means for limiting opening of the buckets are provided, one such means being chains 58a. Any other suitable means may, of course, be used.

The water to the container is supplied by a water-supply conduit 67 and is maintained at the desired level by a float-valve mechanism 69 including a valve 71 and a float 72 operably connected with the valve 71 by means of an arm 74. This float-valve mechanism is of well-known character and any desired type now on the market may be used. One example of such a mechanism is in the water tank of a toilet for limiting or maintaining the water level therein.

The tank or container 10 may be and is shown as being in the ground, although this is not necessary. An enclosed dry compartment or chamber 78 is disposed at one side of the container, with one end of shaft 30 extending into said container. The air pump is operably mounted in the compartment or chamber 78; and shaft 30 is operably connected to the air pump. Also, an electric generator 40 is connected to shaft 30 and driven thereby to supply electrical energy for operating electrical apparatuses or appliances.

Referring to FIG. 6, there is a seal 82 of flexible impervious material, such as a suitable plastic, which is secured to the panels 46 and 48 by any suitable means such as an adhesive, for example. This seal prevents the escape of air from the interior of the bucket through the hinge.

Referring to FIG. 7, there is shown an alternative arrangement wherein the panel that is attached to the belt is indicated at 46a and has outwardly turned ends 84 which are normal to the plane of the panel 46a. The ends 84 are triangular in shape with the base at the bottom, as shown in FIG. 7. Each triangular part has inturned flanges 86 which serve as stops for the movable panel 48a which is connected to the panel 46a by hinge 54a. The panel 48a is thus pivotally movable in the manner similar to the panel 48 here and above described. The back panel 46z is arcuate in cross-section to better conform to the curvature of the rollers. Panel 48a swings from an extended position, as shown in FIG. 7, to a collapsed position against the outer side of the panel 46a. Opening movement of the panel 48a is limited by the stop flanges as above described.

Under some conditions, it is desirable to provide starting air under pressure, a conduit 92 being connected to a source (not shown) of air under pressure. Conduit 92 is connected to a conduit 90 through a valve 94. Conduit 90 is connected to the air-delivery pipe or conduit 70. To start the apparatus, the valve 38*v* is closed and the valve 94 opened; thus starting air is supplied to the discharge pipe 66. As the apparatus starts operating, the inlet valve 38*v* is opened and the valve 94 closed — the operation of the apparatus then being controlled by the valve 38*v*.

Under some circumstances, it may be desirable to stop the apparatus, particularly at a certain part of the belt. For this purpose, a brake 98 is provided for the shaft 30. The use of the brake and the closing of the valve 38*v* make it possible to effect such stopping of the apparatus.

In FIG. 8 there is shown another alternative bucket arrangement. The panels of this arrangement are flexible and have reinforcing strips 100 and 102 of metal or other suitable material.

The invention and its attendant advantages will be understood from the foregoing description and it will be apparent that various changes may be made in the form, construction and arrangement of the parts without departing from the spirit or scope thereof or sacrificing its material advantages, the arrangement hereinbefore being merely by way of example; and I do not wish to be restricted to the specific form shown or uses mentioned except as defined in the accompanying claims.

I claim:

1. A power unit, comprising:
   a pair of rotatable rollers spaced vertically apart, said rollers having axial shafts extending outwardly thereof;
   fixed means for supporting the rollers in vertical alignment with each other;
   an endless belt operably disposed on said rollers, a portion of said belt being adapted to move upwardly and an opposite portion being adapted to move downwardly;
   a plurality of collapsible air buckets attached to said belt, said buckets extending transversely of said belt and spaced apart longitudinally thereon;
   said buckets including a movable panel hinged along one horizontal edge and attached to the belt so that said panel swings away from and toward the belt, the buckets on the portion of the belt moving upwardly opening downwardly and said buckets opening upwardly on the opposite downwardly moving portion of the belt;
   means for operably closing the ends of the bucket;
   air-discharge means adjacent the lower roller for discharging air upwardly into the buckets as said buckets move past said means;
   an air pump connected to one of said rollers, said air pump having an inlet and an outlet;
   means operably connecting the outlet of the air pump to the air-discharge means for delivering air under pressure thereto.

2. The invention defined by claim 1, including a control valve controlling the air inlet of the air pump.

3. The invention defined by claim 1, wherein the air-discharge means comprises a horizontal air-discharge pipe having air outlets, said pipe being positioned adjacent the bottom of the belt and toward the side of the belt portion moving upwardly for discharging air into the buckets as they pass over the lower roller.

4. The invention defined by claim 1, wherein there is sealing means for sealing the hinge against escape of air therethrough.

5. The invention defined by claim 1, wherein the buckets have a second panel secured to the belt and to the movable panel by means of the hinge, said second panels being arcuate in cross-section and having a curvature the same as the circumference of the rollers.

6. The invention defined by claim 1, wherein there is a small air chamber along the free edge of the movable panel.

7. The invention defined by claim 1, wherein the means for closing the ends of the buckets comprise flexible impervious material.

8. The invention defined by claim 7, wherein said flexible impervious material is accordian foldable.

9. The invention defined by claim 1, wherein there is a solid panel secured to the belt and to which the movable panel is hinged, the panel secured to the belt having outwardly turned end portions normal to the plane of said panel, each of the end portions having an inturned flange that serves as a stop for limiting opening movement of the movable panel.

10. The invention defined by claim 1, including a container for water in which the rollers and belt are mounted.

11. The invention defined by claim 10, wherein there is a dry chamber which is vented to atmosphere and in which the air pump is disposed.

12. The invention defined by claim 10, including a cover for the container for water, said cover providing an air space above the water level in said container, said cover having a vent to atmosphere.

13. The invention defined by claim 1, including means for starting the power unit.

14. The invention defined by claim 13, wherein the means for starting the power unit comprises air under pressure from a source of pressure air.

15. The invention defined by claim 14, including an air-control valve controlling the air inlet of the air pump; conduit means for connecting said source of pressure air with the inlet of the air pump posterior of the air-control valve; and a valve controlling the conduit means connecting said source of air with the inlet of the air pump.

* * * * *